Oct. 29, 1935.  R. J. COUTURE  2,018,950
MACHINE FOR MAKING SANDWICH BISCUITS
Filed June 21, 1934  3 Sheets-Sheet 1
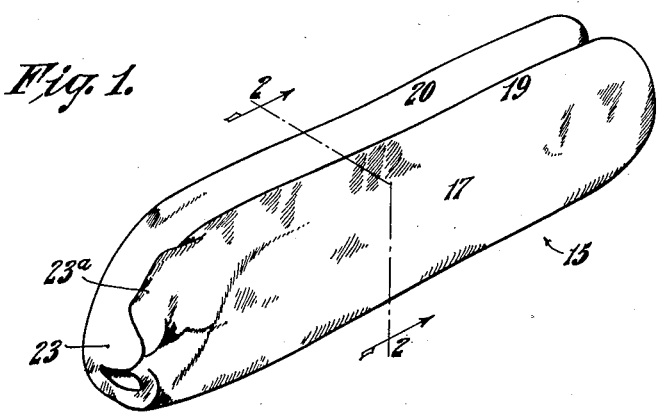
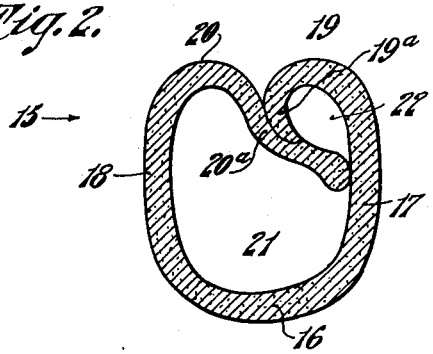
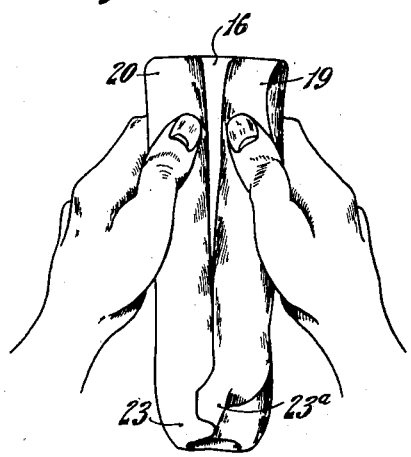
INVENTOR.
Romeo J. Couture
BY
Richard Palbot
ATTORNEY.

Oct. 29, 1935.  R. J. COUTURE  2,018,950
MACHINE FOR MAKING SANDWICH BISCUITS
Filed June 21, 1934   3 Sheets-Sheet 2
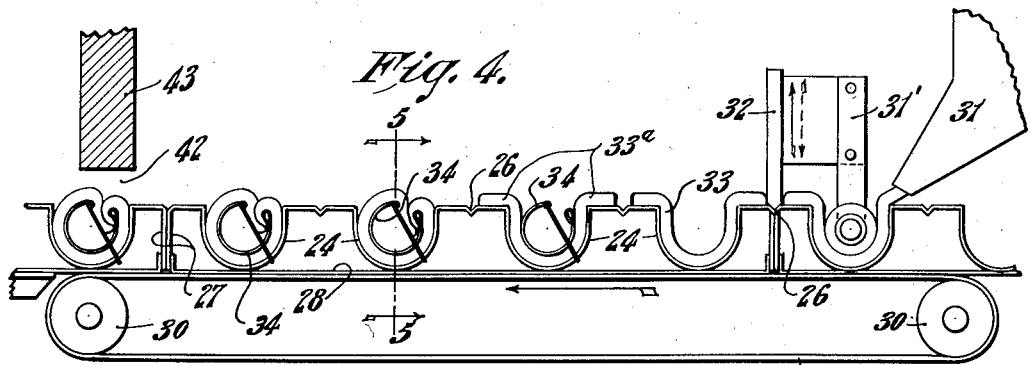
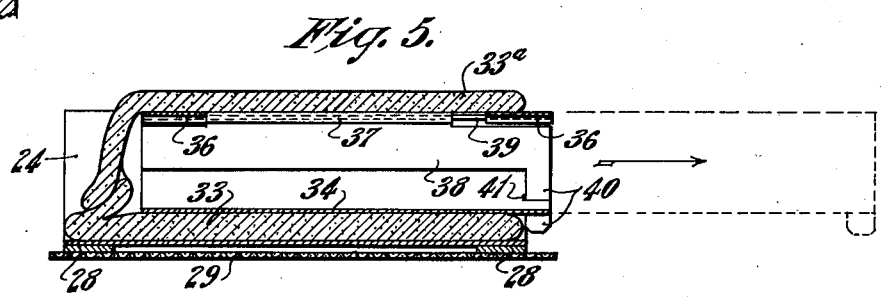
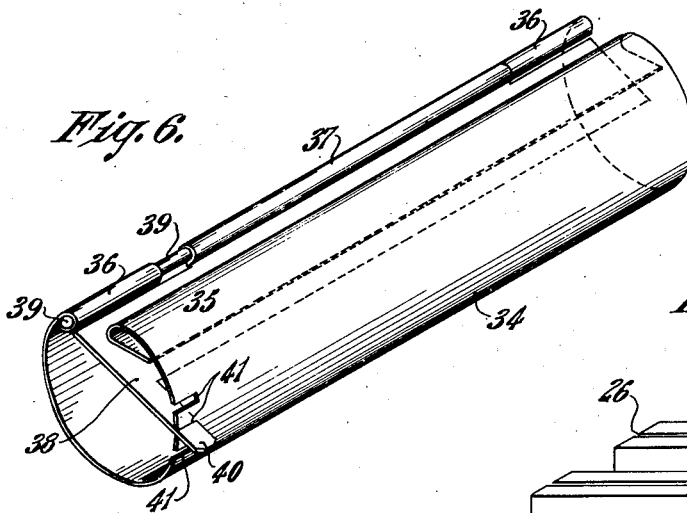
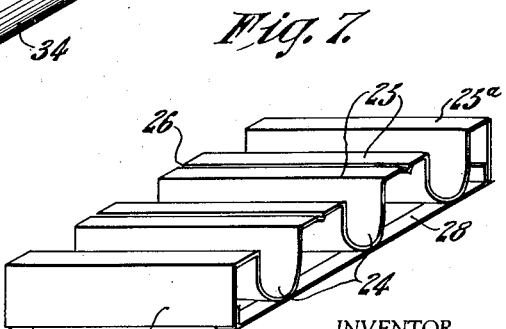
INVENTOR.
Romeo J. Couture
BY Richard J. Talbot
ATTORNEY.

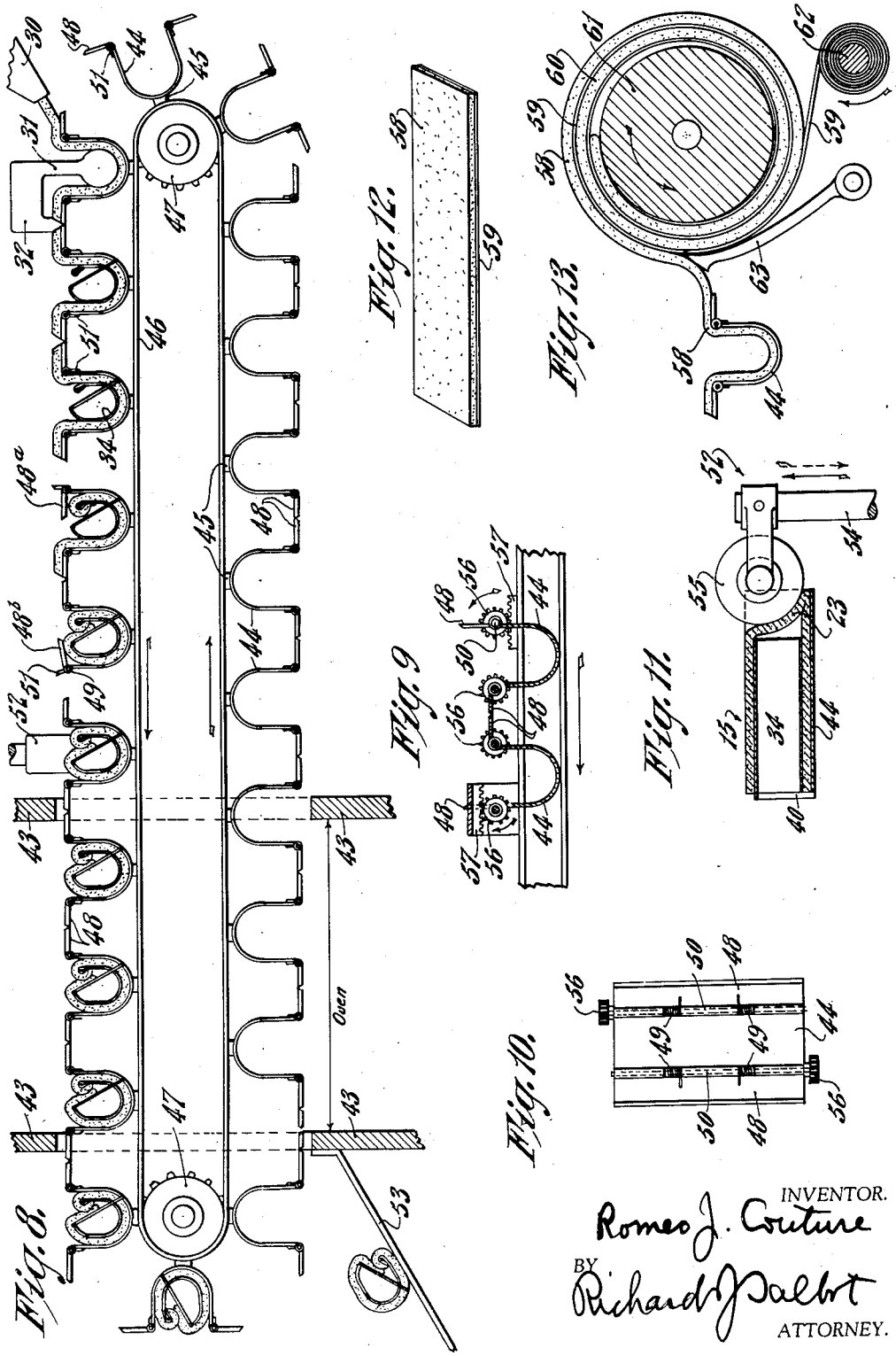

Patented Oct. 29, 1935

2,018,950

UNITED STATES PATENT OFFICE 2,018,950

MACHINE FOR MAKING SANDWICH BISCUITS

Romeo J. Couture, Springfield, Mass., assignor of one-half to Richard J. Talbot, Springfield, Mass.

Application June 21, 1934, Serial No. 731,684

14 Claims. (Cl. 107—4)

This invention relates to certain new and useful improvements in sandwich biscuits and process and machine for making same.

The primary object of the invention is to provide a sandwich biscuit closed at one end and open at the other and provided with a pair of end opening longitudinally extending chambers of different cross sectional areas respectively for the reception of a meat, such as sausage or similar filling and a pickle, celery or the like.

A further object of the invention is to provide a sandwich roll of the foregoing character wherein opposite side edges of a dough blank are rolled or turned inwardly with one side edge traversing the other side edge to provide longitudinally extending chambers within the roll of different cross-sectional areas with one end of the roll sealed to close corresponding ends of the chambers whereby fillings or inserts may be introduced into the chambers through the open ends thereof.

The invention further embodies apparatus for the forming of a sandwich roll of the foregoing character wherein a strip of dough is fed to forms, shaped thereto and cut to the desired dimension with the opposite side edges turned or rolled inwardly to provide the food receiving chambers in the rolls and delivered to an oven for the baking process.

A further object of the invention is to provide apparatus for forming sandwich rolls with dough blanks delivered to outer forms with inner forms placed on the dough blanks in the outer forms to accomplish the shaping of the roll, the inner forms being adjustable to vary the internal dimensions of the chambers in the roll.

A still further object of the invention is to provide a machine for forming sandwich rolls and particularly to the process of feeding dough to the roll forms consisting of a reel of a dough sheet or strip upon a carrier of cloth, wire or paper, the dough strip being separated from the carrier and delivered to roll forms by winding the carrier onto a driven shaft.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a perspective view of a sandwich roll constructed in accordance with the present invention, showing one end thereof pinched into closed position;

Figure 2 is a cross-sectional view taken on line 2—2 of Figure 1 showing the inwardly bent or rolled opposite side edges of the dough blank to form separate chambers within the roll;

Figure 3 is a schematic view showing the roll being partially opened for the reception of a filler in the main chamber;

Figure 4 is a fragmentary longitudinal sectional view showing an endless conveyor for delivering pans or racks to an oven, the means for supplying, shaping and cutting roll dough blanks with internal forms for the dough blanks;

Figure 5 is a detail sectional view taken on line 5—5 of Figure 4 showing the dough blank formed into a roll with the inner form therein, the latter being illustrated by dotted lines in its removed position;

Figure 6 is a perspective view of the inner form showing the adjustable plate for varying the dimensions of one of the chambers of the roll;

Figure 7 is a perspective view of one of the pans, racks or outer forms;

Figure 8 is a longitudinal sectional view showing individual forms carried by an endless conveyor that moves through a baking oven with dough feeding, shaping and cutting means and means for turning opposite edges of the dough blanks over parts of inner forms;

Figure 9 is a detail sectional view showing racks and pinions for the operation of arms for turning inwardly the opposite edges of the dough blanks;

Figure 10 is a top plan view of one of the outer forms showing the tensioned hinge extensions at the upper edges thereof for turning the edges of the dough blank inwardly;

Figure 11 fragmentarily illustrates by side elevation the device for closing one end of the roll with the latter shown in section;

Figure 12 is a perspective view of a dough strip carried by a cloth, wire or paper backing; and Figure 13 is a fragmentary side elevational view showing a reel of a dough strip and carrier with the device for separating the dough strip from the carrier.

The sandwich roll is shown in Figures 1 to 3. The roll is of tubular formation and is formed from a dough blank into a roll designated in general by the reference character 15 and including a bottom 16, side walls 17 and 18 and top walls 19 and 20. The top walls 19 and 20 are in the form of inturned flanges 19a and 20a respectively, the flange 19a being relatively short while the flange 20a is relatively long to traverse the free end of the flange 19a and terminate adjacent the inner face of the side wall 17, this arrangement providing a relatively large internal chamber 21 and a relatively small internal chamber 22 as clearly shown in Figure 2. During the forming of the roll into tubular formation to provide the chambers 21 and 22, one end of the roll is pinched or compressed as at 23 to close corresponding ends of the chambers 21 and 22 and the closed end 23 of the roll has an overlapping portion 23a causing coherence of the parts at the closed end of the roll.

During the baking of the roll, a crust forms externally thereof, but the flanges 19a and 20a may be separated as schematically illustrated in Figure 3 against inherent tension in the walls of the roll and without breaking the latter for the purpose of inserting a filler into one or both chambers of the roll, such as a sausage or meat or the like in the chamber 21 and a pickle, celery or the like in the chamber 22. It is to be understood however that the fillers or inserts may be introduced into the roll at the open ends of the chambers.

The apparatus for producing the sandwich roll shown in Figures 1 to 3 and by which the process is practiced is shown in Figures 4 to 13 and at this time particular attention is directed to Figures 4 to 7. The dough from a hopper is delivered to pans, racks or outer forms to be shaped and cut into roll size blanks with inner forms placed in the dough blanks and the opposite edges of the dough blanks rolled into the inner forms to shape the blanks into rolls, the latter still carried by the pans being delivered to a baking oven by means of an endless conveyor.

The pan, rack or outer form as shown in detail in Figure 7 comprises a series of U-shaped outer forms 24, each carrying a horizontal flange directed outwardly at its upper side edges with adjacent edges of the flanges spaced from each other as at 26, the outer flanges 25a of the end forms carrying depending side walls 27 terminating at their lower edges in the planes of the lower ends of the U-shaped forms for attachment to longitudinally extending edge strips 28 to form a rigid construction of pan or the like. The outer form assembly shown in Figure 6 is placed on the endless conveyor 29 travelling over feed rollers 30 and said forms travel beneath a dough hopper 31 that delivers dough into the outer forms 24. A vertically movable plunger 31 descends into the outer form 24 for shaping the dough to the contour thereof and to reduce the same to the desired thickness and said plunger 31 is associated with a vertically movable knife 32 that moves downwardly through the dough into the space 26 between the flanges 25 for severing the dough into roll blanks of the desired dimensions, the dough blank being illustrated by the reference character 33 in Figure 4.

An inner form is inserted in the dough blank 33 and being designated in general by the reference character 34 is shown in Figure 6 as being of tubular formation and longitudinally split with one longitudinal split edge rolled inwardly as at 35. The other split edge of the inner form is provided at opposite ends with hinge barrels 36 with which an intermediate barrel portion 37 of a hinge plate 38 is alined, the barrel portions 36 and 37 receiving a hinge pintle 39. The hinge barrel 37 is of less length than the distance between the hinge barrels 36 to allow limited longitudinal movement of the hinge plate 38 relative to the tubular inner form 34 whereby the end extension finger 40 upon the hinge plate may be selectively positioned in the slots 41 at the end of the inner form for varying the initial cross-section of the chamber 21 in the roll 15. The opposite edges 33a of the dough blank 33 are turned inwardly or rolled over the respective edges 35 and the hinged edge of the inner form 34 as shown in Figure 4 and the rolled dough blank in this form is then delivered through the entrance or door opening 42 into the oven 43 for baking. The outer form carrying the dough strip wrapped around the inner forms passing into the oven. After the rolls have been baked, the inner forms are removed therefrom as illustrated by dotted lines in Figure 5.

In the form of invention shown in Figure 8, individual outer forms for the rolls are carried by an endless conveyor and the latter moves through a baking oven and automatic means are provided for turning the edges of the dough blank inwardly over the split edges of the inner forms. Each outer form includes a U-shaped member 44 attached as at 45 to the endless conveyor 46 moving over drive wheels 47 and the upper side edge of each form 44 carries a horizontal flange 48 normally outwardly directed thereof by means of a coil spring 49 associated with the hinge connection 50 between the form 44 and the flange 48 and each flange 48 includes a catch 51 movable into engagement with the member 44 to hold the flange 48 on its hinge mounting 50 against the tension of the spring 49 in a normally horizontal outwardly extending position.

Dough is fed from the hopper 30 into each form 44 and is shaped therein by the plunger 31 and cut into roll lengths by the knife 32. An inner form 34 as shown in Figure 6 is then placed in each outer form and the flanges 48 are swung inwardly on their hinge mountings to move opposite side edges of the dough blank that normally rest thereon into the inner form, these flanges sequentially operating as indicated by the reference characters 48a and 48b in Figure 8. The flanges 48 move a sufficient distance to cause the flanges 19a and 20a of the sandwich roll to be moved into the chamber 21 as shown by the finished article in Figure 2 and through the split opening in the inner form 34. After the roll has been completely formed, the plunger 52 descends into engagement with one end of the roll for pinching or depressing the same as shown at 23 in Figures 1 and 3. The formed rolls on the endless conveyor 46 then move through the oven 43 and are timed in said movement to accomplish complete baking, the baked rolls carrying the inner forms being discharged from the outer forms upon the gravity chute 53, the inner forms being thereafter removed therefrom. The plunger 52 for pinching or closing one end of the roll is shown in detail in Figure 11 and includes a plunger rod 54 carrying a pressing roller 55 laterally thereof that descends into movement with one end of the roll to close the same at 23 as illustrated.

In the form of invention illustrated in Figures 9 and 10, a pinion 56 is associated with each hinge mounting 50 of the separate forms 44 and said pinions move in contact with racks 57 for the operation of the flanges 48 to move them to positions overlying the outer forms for turning the opposite edges of the dough blank inwardly and into the inner forms.

Should difficulty be experienced in feeding heavy dough to the hoppers 30, the dough may be preformed into a strip as shown in Figure 12 and designated by the reference character 58 that is mounted upon a carrier in the form of a cloth, wire, paper or like strip 59. As shown in Figure 13, the dough strip and carrier in Figure 12 is rolled into reel formation 60 upon a drum 61 and the dough strip is fed from said drum and reel to the outer forms 44. The carrier strip 59 is wound onto the drilling shaft 62 being separated from dough strip 58 by means of the device 63 that causes such severance of the dough strip from the carrier at a point substantially in the plane of the outer forms.

From the above detailed description of the invention it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. Apparatus for making a hollow sandwich roll comprising an outer concaved form, normally outwardly directed flanges hinged to the upper side edges of the form, means for shaping dough in the form and means for automatically swinging the flanges inwardly to overlie the form for moving the side edges of the dough into the form.

2. Apparatus for making a hollow sandwich roll comprising an outer concaved form, a normally outwardly directed flange hinged to each upper side edge of the form, means for shaping the dough in the form, means for automatically swinging the flanges inwardly to overlie the form for moving the edges of the dough into the form, and means for closing one end of the roll.

3. Apparatus for making a hollow sandwich roll comprising an outer concaved form, a normally outwardly directed flange hinged to each upper side edge of the form, means for shaping the dough in the form, means for automatically swinging the flanges inwardly to overlie the form for moving the edges of the dough into the form, an endless conveyor upon which the forms are mounted, the forms being arranged in series and equidistantly spaced, a baking oven through which the conveyor travels, and means for closing one end of the roll.

4. Apparatus for making a hollow sandwich roll comprising an outer concaved form, a normally outwardly directed flange hinged to each upper side edge of the form, means for shaping the dough in the form, means for automatically swinging the flanges inwardly to overlie the form for moving the edges of the dough into the form, an endless conveyor upon which the forms are mounted, and said flanges being alternately operable.

5. Apparatus for making hollow sandwich rolls comprising outer forms, means for delivering dough to the forms, means for shaping the dough to the forms and separating the dough into roll length blanks, and an inner form adapted to be placed on the dough blank in each outer form, the inner form being constructed and arranged to permit rolling movement of the opposite side edges of the dough blank into the interior thereof.

6. Apparatus for making hollow sandwich rolls comprising outer forms, means for delivering dough to the forms, means for shaping the dough to the forms and separating the dough into roll length blanks, and an inner form adapted to be placed on the dough blank in each outer form, the inner form being constructed and arranged to permit inward rolling of the opposite side edges of the dough blank, and automatically operating means for rolling the opposite side edges of the dough blank inwardly.

7. Apparatus for making hollow sandwich rolls comprising outer forms, means for delivering dough to the forms, means for shaping the dough to the forms and separating the dough into roll length blanks, and an inner form adapted to be placed on the dough blank in each outer form, the inner form being constructed and arranged to permit inward rolling of the opposite side edges of the dough blank and automatically operating means for rolling the opposite side edges of the dough blank inwardly, including hinged members on the upper side edges of the outer forms and rack and pinion mechanism for moving the hinged members.

8. Apparatus for making hollow sandwich rolls comprising outer forms, means for delivering dough to the forms, means for shaping the dough to the forms and separating the dough into roll length blanks, an inner form adapted to be placed on the dough blank in each outer form, the inner form being constructed and arranged to permit rolling movement of the opposite side edges of the dough blank into the interior thereof, the inner forms each being of tubular formation and longitudinally split with one edge rolled inwardly and a plate hinged to the other split edge and adjustably engaged with the opposite wall of the form for limiting inward movement of the adjacent side edge of the dough blank.

9. Apparatus for making hollow sandwich rolls comprising outer forms, means for delivering dough to the forms, means for shaping the dough to the forms and separating the dough into roll length blanks, an inner form adapted to be placed on the dough blank in each outer form, the inner form being constructed and arranged to permit rolling movement of the opposite side edges of the dough blank into the interior thereof, automatically operating means for rolling the opposite side edges of the dough blank inwardly, the inner forms each being of tubular formation and longitudinally split with one edge roller inwardly and a plate hinged to the other split edge and adjustably engaged with the opposite wall of the form for limiting inward movement of the adjacent side edge of the dough blank.

10. Apparatus for making hollow sandwich rolls comprising plans having U-shaped forms carrying upper outwardly directed horizontal flanges spaced at adjacent edges, means for delivering dough to the forms, means for shaping the dough in the forms, a vertically reciprocable knife for cutting the dough into roll lengths and moving in line with the space between the form flanges, an inner form adapted to be placed on the dough blank in each outer form, the side edges of the dough blank normally resting on the outer form flanges adapted to be moved inwardly to inclose the inner forms and an endless conveyor for moving the pans into a baking oven.

11. Apparatus for making hollow sandwich rolls comprising U-shaped forms carrying upper outwardly directed horizontal flanges spaced at adjacent edges, means for delivering dough to the forms, means for shaping the dough in the forms, a vertically reciprocable knife for cutting the dough into roll lengths and moving in line with the space between the form flanges, an inner form adapted to be placed on the dough blank in each outer form, said flanges being hinged to the outer forms, means for automatically swinging the flanges inwardly to move the side edges of the dough blank normally resting thereon into inclosing relation with respect to the inner forms, an endless conveyor to which each form is fixed and a baking oven through which the conveyor moves the form roll blanks for baking.

12. Apparatus for making hollow sandwich rolls comprising outer forms, a reel for a dough strip and a flexible ribbon carrier, means for separating the dough strip from the ribbon carrier for delivery of the dough strip to the outer forms and an inner form adapted to be placed in each outer form.

13. Apparatus for making hollow sandwich rolls comprising outer forms, a reel of a dough strip and a flexible ribbon carrier with the ribbon carrier separating the convolutions of the dough strip of the reel to prevent cohesion, a winding shaft to which the outer free end of the carrier strip is attached and a wedge shaped device associated with the peripheral edge of the reel to separte the dough strip from the ribbon carrier for delivery of the dough strip to the outer forms and an inner form adapted to be placed in each outer form.

14. Apparatus for making sandwich rolls wherein dough is fed to molds, said dough being in ribbon form and a flexible ribbon carrier for the dough, and a wedging element for separating the dough ribbon from the flexible ribbon carrier prior to delivery of the ribbon of dough to the molds.

ROMEO J. COUTURE.